United States Patent
Edlinger

(10) Patent No.: US 6,319,434 B1
(45) Date of Patent: Nov. 20, 2001

(54) METHOD FOR GRANULATING AND GRINDING LIQUID SLAG AND DEVICE FOR REALIZING THE SAME

(75) Inventor: Alfred Edlinger, Baden (CH)

(73) Assignee: "Holderbank" Financière Glarus AG, Glarus (CH)

( * ) Notice: Subject to any disclaimer, the term of this patent is extended or adjusted under 35 U.S.C. 154(b) by 0 days.

(21) Appl. No.: 09/403,258

(22) PCT Filed: Feb. 17, 1999

(86) PCT No.: PCT/AT99/00040

§ 371 Date: Oct. 18, 1999

§ 102(e) Date: Oct. 18, 1999

(87) PCT Pub. No.: WO99/42623

PCT Pub. Date: Aug. 26, 1999

(30) Foreign Application Priority Data

Feb. 18, 1998 (CH) ................................................ GM 94/98

(51) Int. Cl.[7] .................................................. B29B 9/10
(52) U.S. Cl. .................................. 264/11; 264/12; 425/6; 425/7
(58) Field of Search ........................... 264/11, 12; 425/6, 425/7

(56) References Cited

U.S. PATENT DOCUMENTS 2,533,633   12/1950  Schott .
4,352,764   10/1982  Metz et al. ................................ 264/8
6,196,479 *  3/2001  Edlinger .................................... 241/1

FOREIGN PATENT DOCUMENTS

| 39 19 155 | 1/1990 | (DE) . |
| 1032608 | 6/1966 | (GB) . |
| 1542926 | 2/1990 | (SU) . |
| 1742243 | 6/1992 | (SU) . |
| 95/15402 | 8/1995 | (WO) . |

OTHER PUBLICATIONS

Patent Abstracts of Japan, vol. 003, No. 027 (C–039), Mar. 7, 1979 & JP 54 001296 A (Sumitomo Metal Ind Ltd), Jan. 8, 1979 siehe Zusammenfassung.

Patent Abstracts of Japan vol. 011, No. 090 (M–573), Mar. 20, 1987 & JP 61 243104 A (Nippon Jiryoku Senko KK), Oct. 29, 1986 siehe Zusammenfassung.

Patent Abstracts of Japan vol. 099, No. 002, Feb. 26, 1999 & JP 10 296206 A (Nippon Steel Corp), Nov. 10, 1998 siehe Zusammenfassung.

* cited by examiner

Primary Examiner—Mary Lynn Theisen
(74) Attorney, Agent, or Firm—Kevin E. Joyce

(57) ABSTRACT

In a process for granulating and disintegrating molten slags, in particular blast furnace slags, with water, a compressed water jet is directed into the slag and the slag is ejected as the jacket of the compressed water jet. The device for carrying out the process comprises a slag vessel for molten slag including an outlet opening for the molten slag, wherein a lance opens into the axis of the slag outlet opening such that the molten slag is ejected by compressed water or vapor introduced through the lance.

16 Claims, 7 Drawing Sheets

METHOD FOR GRANULATING AND GRINDING LIQUID SLAG AND DEVICE FOR REALIZING THE SAME

This application is the national phase of international application PCT/AT99/00040 filed Feb. 17, 1999 which designated the U.S.

SUMMARY OF THE INVENTION

1. Field of the Invention

The invention relates to a process for granulating and disintegrating molten slags, in particular blast furnace slags, with water, in which a compressed water jet is directed into the slag. The invention also relates to a device for carrying out this process, comprising a slag vessel for molten slag including an outlet opening for the molten slag.

2. Description of the Related Art

A process for granulating and disintegrating molten material is described, for instance, in AT-B 400 140. In that known mode of procedure melt was introduced into a mixing chamber under pressure with compressed water vapor or water vapor mixtures having been nozzled into the mixing chamber. A configuration for realizing that mode of procedure comprised a multicomponent nozzle, wherein a pressure causing the solidified particles to be ejected via a diffuser was built up due to the rapid expansion. The kinetic energy of the particles was utilized for disintegration, to which end, for instance, baffle plates were arranged to follow the diffuser or the exit jet of the diffuser was directed against the exit jet of a further diffuser.

Besides water granulation, also processes in which the slags were spread to a low slag height or thickness and solidified by means of air or compressed air have already been proposed.

By those known processes, granulates having grain sizes of about 2 to 6 mm were obtained provided the plant technological expenditures and, in particular, the size of the plant were not to rise superproportionally. For further comminution of the material various types of mills and, in particular, jet mills have already been proposed. The applicability of jet mills does, however, presuppose that the granulates are available in a pneumatically conveyable form.

Austrian application A 1826/97 has already proposed to convey the molten slag through a slag atomizer where compressed water was fed to the molten slag. The molten slag was caused to leave a pressure-proof chamber in the free fall to get into the region of the slag atomizer, where it was granulated by substantially radially directed compressed water. The thus produced granulates were immediately transported into a counterflow mill along with vapor as well as optionally additional vapor or additional propellants. Also according to such a configuration, the disintegration operation proper was performed within the mill, wherein the molten slag had to be introduced into a vessel closeable in a pressure-proof manner before it could be transferred into the granulating device in a free jet.

SUMMARY OF THE INVENTION

The invention aims at further developing a device of the initially defined kind to the extent that slag handling is substantially facilitated and conventional means will do in the slag-charging region. At the same time, the process according to the invention is aimed to ensure a high disintegration efficiency within a small space for granulation and to produce granulates capable of being ground or further comminuted with less additional energy than would be required for conventional granulates.

To solve this object, the process according to the invention essentially comprising dissolving gases, in particular $O_2$, air and/or oxygen inert-gas mixtures, in the slag prior to discharging by the compressed water jet so that iron portions of the slag are quantitatively oxidized, that the slag out through a slag outlet by the pressure of the compressed water and ejecting the slag as the jacket of the compressed water jet. By the slag being available in a slag chute or slag ladle without previous introduction into a pressure-proof vessel, the handling of the slag is substantially facilitated as compared to known proposals, wherein, due to the fact that a compressed water jet is pressed into the slag coaxially with the slag exit from the slag vessel, the water jet immerses in the slag jet over a pressure-depending depth of, for instance, about 0.5 to 1.5 m.

In this manner, kind of a soul" is formed as the water jet penetrates the slag. The evaporation of that "water soul" occurs after at a short delay sufficient for discharging the jet jacketed by solidifying or at least partially solidified slag. Relatively low mechanical demands are set on such a discharge, the emergence of the slag being substantially simpler to realize than with complicated multicomponent nozzles. The exit of the slag jet discharged with a "water soul" is immediately followed by the boiling, as well as the abrupt and explosion-like evaporation, of the water with the kinetics of the intruded water jet overcoming relatively high counter pressures. With the explosion-like widening of the jet at temperatures of about 800 to 1200° C., a high degree of disintegration is ensured by the simultaneous glassy solidification of the granulates.

Blast furnace slag to be granulated generally has a low content of residual pig iron, which is smaller than 0.5% by weight under correct process control. In the event of improper blast furnace operation control, the content of pig iron may, however, rise to as much as 5% by weight. The oxidation of iron portions by oxygen or air reduces the risk of explosions due to the formation of hydrogen gas. A considerably enhanced disintegration effect additionally occurs on account of the solubility of gases in the slag and, in particular, the saturation of the slag with gases. The solubility of gases strongly decreases as the slag temperature drops such that the explosion-like demixing of the dissolved gases due to the falling slag temperature and hence the rapid decrease of the saturation concentration of gases in the molten slag is additionally observed in the region of abrupt cooling by the compressed water jet. The gases thus released from the solidifying slag expand vigorously on account of the relatively high temperatures with an enhanced disintegration of the slag particles being observed. At ambient pressure and 1000° C., approximately 11.2 $m^3$ air or nitrogen/ton of slag are, for instance, formed by such a release of dissolved air, wherein the internal slag gas pressure presumably may range from some 100 bars to more than 1000 bars. Slag particle sizes all below 0.1 mm are immediately obtained in this manner, wherein, in addition, such a slag on account of its porosity may subsequently be further disintegrated by the abruptly released and originally dissolved gases at less expenditures and less energy consumption.

Advantageously, the process according to the invention is carried out in a manner that the compressed water is introduced at a pressure of from 35 to 160 bars. In this manner, it is ensured that the "water soul" is formed over a length sufficient for the jacketed jet to safely leave the outlet part of the slag vessel or a slag tundish, thereby protecting the outlet part from excessive mechanical stress.

Further enhancement of the disintegration effect and of granulation may be obtained in that the solidified jacket of the slag surrounding the compressed water jet is cut or split by additional compressed water.

Basically, it is feasible by the mode of operation according to the invention to immediately obtain a pneumatically conveyable mixture such that after the expansion of the slag particles a mixture is provided in an expansion vessel by collecting these slag particles together with the expanding gases, which mixture may be directly introduced into gas counterflow mills and could be supplied to further disintegration. The vapor forming may be used as a propellant together with the gases forming by degasification and originally dissolved in the slag. In particular, when using additional compressed water jets for cutting or splitting the jet, also the problem of sealing between a connected expansion vessel and a slag tundish is particularly easy to resolve by a seal being accomplishable in the manner of a pneumatic seal and remaining untight spots as throttle cross sections enabling efficient sealing, taking into account the high pressures prevailing.

The device according to the invention for granulating molten slags, in particular blast furnace slags, with water, comprising a slag vessel for molten slag including an outlet opening for the molten slag is substantially characterized in that the slag vessel is designed as a slag tundish and nozzles for air, oxygen and/or oxygen/inert gas mixtures are provided on the lowermost site of the slag lance opens into the axis of the slag outlet opening such that the molten slag is ejected by compressed water or vapor introduced through the lance. The lance provided for introducing compressed water may be designed as a nozzle lance, it merely being required that compressed water is fed in a manner that the initially mentioned "water soul" is formed in the region of the slag exit. In a particularly simple manner, this may be achieved in that the slag tundish comprises a tubular, optionally exchangeable, outlet part including the slag outlet opening. By designing the slag vessel as a slag tundish in which nozzles for air, oxygen and/or oxygen/inert gas mixtures are provided on the lowermost site, a saturation as far as possible of the molten slag with gases and a quantitative oxidation of residual iron portions will be achieved.

In order to enable further disintegration and an increase in the cooling rate, it is contemplated in a particularly advantageous manner that annular nozzles are provided on the tubular outlet part for pressing in water and/or vapor in a radial direction or in a direction inclined relative to the axis of the tubular part in the direction towards the outlet end.

Further improvement of the cooling parameters and of the disintegration effect may be obtained in that an expansion vessel is connected to the outlet part, wherein, preferably, further nozzles for introducing water or vapor open into the expansion vessel in the radial and/or tangential direction. Such nozzles opening into an expansion vessel, if opening in the radial direction, may directly serve the further disintegration and cutting of the slag jet with kind of a cyclone effect being additionally exertable by the additional nozzles opening in the tangential direction, the reaction space available, thus, being be better utilizable for cooling. As a result, the overall device may be built smaller, yet by ensuring the desired cooling to the extent required.

In a particularly simple manner, the outlet opening of the expansion vessel is connected with a mill for further comminution, wherein, in a simple manner, the consecutively arranged mill comprises a rotor designed as a centrifugal wheel, a baffle plate or a counterflow nozzle for vapor and/or grinding material coaxially with the outlet opening of the expansion vessel.

It has been shown by comparative tests that a slag abruptly degassed in the manner according to the invention requires considerably less specific grinding work than slags not treated by gases. At a target fineness of about 6500 Blaines, a "gas-free" slag, for instance, requires a specific grinding work of about 120 kWh/ton$_{slag}$. For the same grinding fineness, the slag initially saturated with gas and subsequently degassed in the manner according to the invention requires less than 50 kWh/ton$_{slag}$. Surprisingly, it was, furthermore, found that in case of mixed cement, using approximately 60% by weight of slag and 40% by weight of clinker as well as gypsum, the slag granulated and disintegrated within the scope of the process according to the invention results in an elevated initial strength as compared to conventionally granulated slags.

Bearing in mind the high pressures developing during expansion, the major portion of the pressure can subsequently be relieved in counterflow mills. Jet mills are, thus, a preferred variant of use of the granulates produced according to the invention, wherein additional measures aimed at energy recovery may be taken within the scope of such jet mills. In particular, it is possible to operate under subatmospheric pressure in the grinding space if the water vapor introduced is condensed externally, whereby a rapid pressure decrease may be obtained. In addition to using baffle plates, the configuration of the impact surface as a centrifugal wheel is of particular advantage as pointed out above, energy recovery again being feasible by the rotor itself, which is designed as a centrifugal wheel. Any eventually remaining oversize grains may be separated, for instance, by a screening means or a cyclone, coarse grains being recyclable into the process and, in particular, into the mill.

Particularly small structural dimensions will result from a vertical arrangement of the expansion vessel and consecutively arranged mill. Yet, the pneumatically conveyable mixtures may, of course, be introduced into appropriate conventional counterflow mills via slag injectors also horizontally.

BRIEF DESCRIPTION OF THE DRAWINGS

In the following, the invention will be explained in more detail by way of exemplary embodiments of the device according to the invention, which are schematically illustrated in the drawing. Therein.

DETAILED DESCRIPTION OF THE INVENTION

Figure 1:
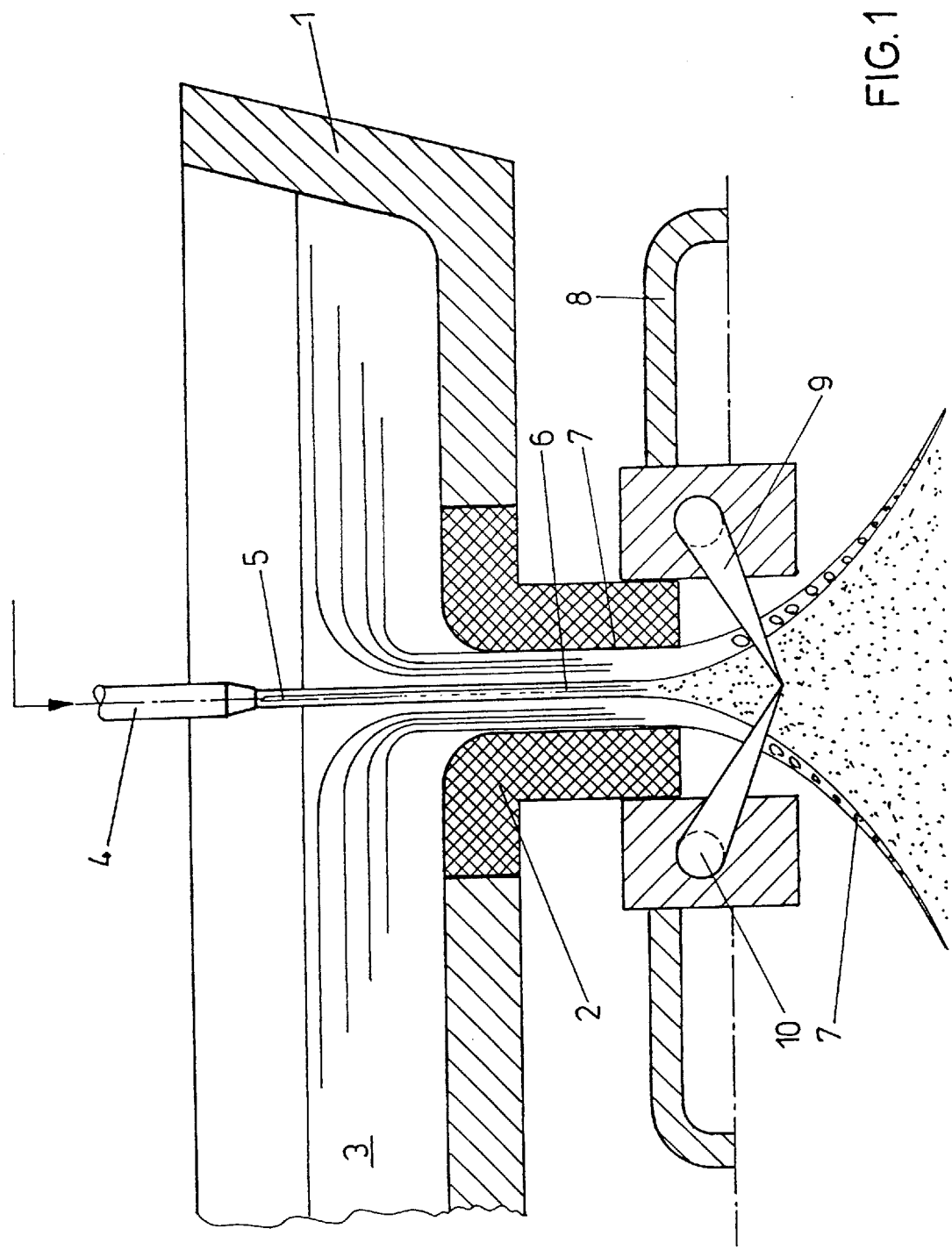
FIG. 1 is a cross section through part of the granulating device.

In FIG. 1 a vessel for slag, which is designed as a slag tundish, is illustrated in partial section and denoted by 1. An outlet part 2 made of a suitable mechanically and thermally resistant material is inserted in the bottom of the slag tundish 1. Into the slag melt 3 a water jet 5 is pressed into the slag bath at a pressure of approximately 60 to 100 bars via a high-pressure water lance 4, a "water or vapor soul" 6 being formed in the region of the outlet part 2 and the slag being discharged as the jacket 7 of that "water soul". The slag jet jacketing the compressed water jet reaches a schematically indicated expansion vessel 8 with the internal pressure of the "water soul" widening and tearing the jacket.

In the region of the intake into the expansion vessel 8 additional compressed water nozzles 9 are provided, feeding being effected via an annular duct 10. The water under pressure or water cone is directed onto the jacket 7 of the slag jet, causing splitting and further disintegration of the same.

The high-pressure water jet, at the same time, forms a sealing element assisting the sealing surfaces in the region of the connection of the outlet 2 to the expansion vessel 8.

Figure 2:
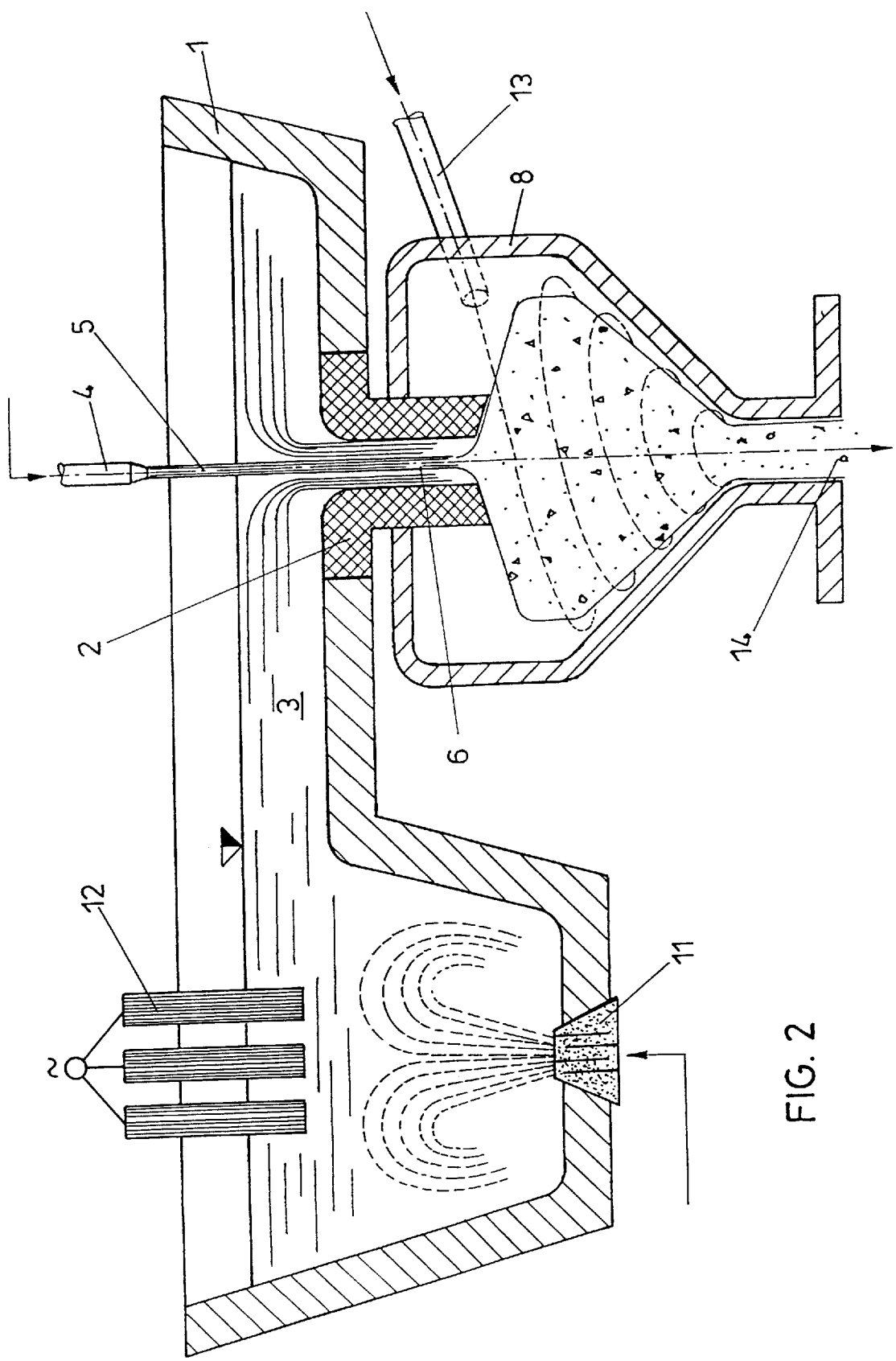
FIG. 2 is a cross section through a slag tundish with an expansion vessel designed as a cyclone.

From the illustration according to FIG. 2 the slag tundish 1 is apparent in its entirety, wherein a nozzle brick 11 is arranged on the lowermost site of the tundish, on which a metal bath may collect below the slag melt, through which nozzle brick compressed air may be blown in for oxidizing residual iron. In addition to such compressed air or air oxygen mixtures, inert gas may be pressed in in order to thereby effect the saturation of the slag with gases to the major extent. The slag itself may be kept in the molten state by means of an electrical heating schematically indicated by 12. During evaporation, the "water soul" 6 causes the explosion-like widening of the jacket and hence rapid cooling and disintegration. The disintegration effect is accelerated by the dissolved gases demixing in an explosion-like manner with the temperature, and hence the gas solubility, decreasing.

Furthermore, a secondary compressed water lance or nozzle 13 opens into the expansion vessel 8, setting the disintegrating particles in a rotating cyclone movement so as to obtain intensive cooling over a short falling height.

The vapor slag granulate mixture having a particle size of about 0.1 mm is drawn off through the outlet opening 14 of the expansion vessel 8 and may immediately be charged into a jet mill or any other further comminution means.

Figure 3:
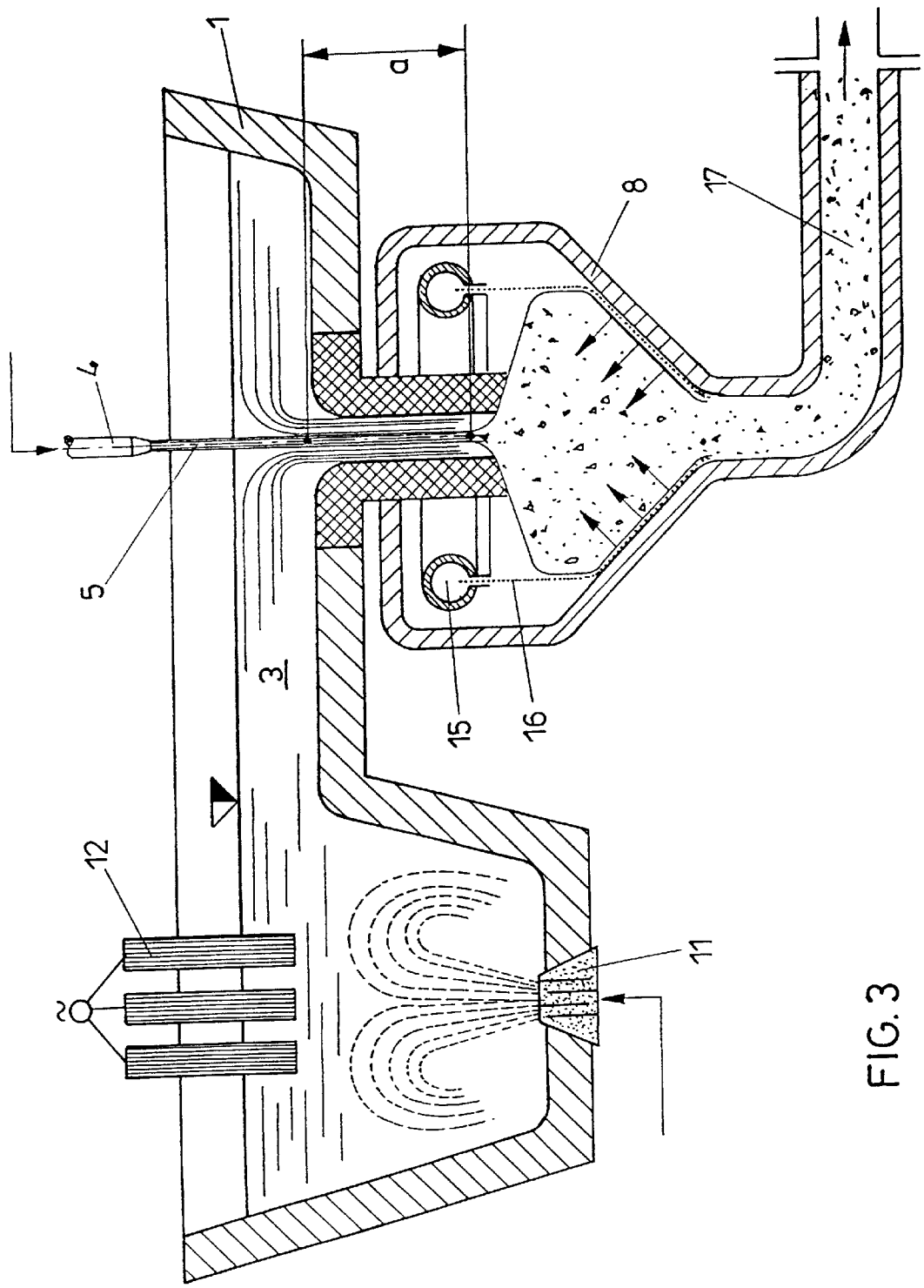
FIG. 3 depicts a modified embodiment of the device according to FIG. 2, comprising a modified expansion vessel.

In the embodiment according to FIG. 3, the expansion vessel 8 is not designed as a cyclone. Instead, compressed water is fed through an annular duct 15 and conducted to the wall of the expansion vessel 8 in the manner of a curtain 16. In the zone of collision with the disintegrating particles a vapor cushion is built up such that the walls of the expansion vessel 8 are effectively cooled and, at the same time, additional vapor is generated for forming a pneumatically conveyable mixture. The vapor granulate mixture is charged into a comminution means, for instance a jet mill, via duct 17.

The length over which the injected high-pressure water jet 5 is present as a "water soul" jacketed by the slag is denoted by a in FIG. 3. Following that path a occurs the rapid evaporation of the "water soul", while an intensive assisting comminution effect is simultaneously exerted by the originally dissolved gas being rapidly released with the temperature decreasing.

Figure 4:
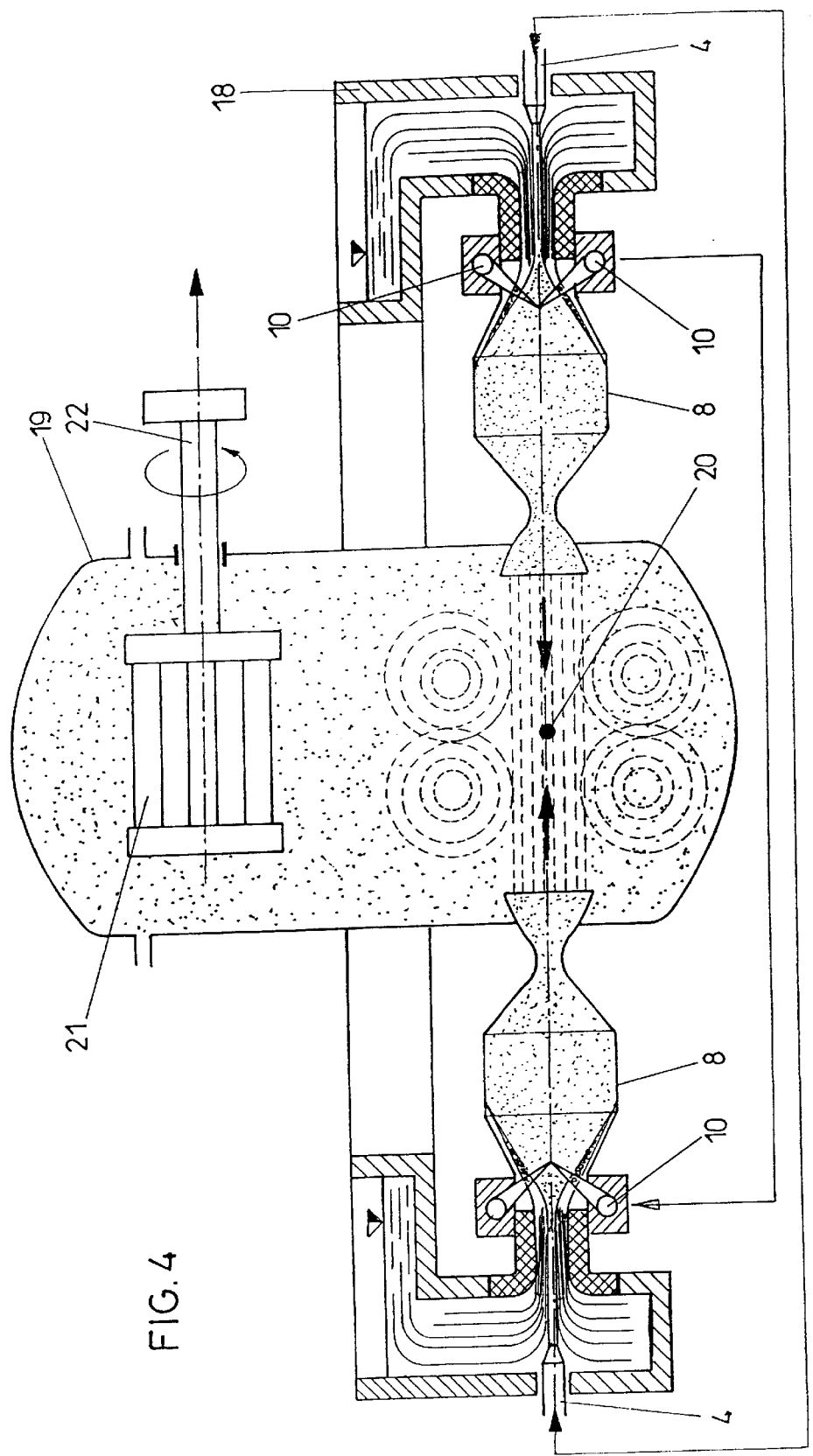
FIG. 4 in a partially sectioned view illustrates a horizontal arrangement of the slag granulating device including a counterflow mill connected to the expansion vessel.

In the configuration according to FIG. 4, an annular melt slag chute 18 is provided, to which the high-pressure water lances 4 are laterally connected. Again, a high-pressure water soul is formed by means of the high-pressure water lances 4, expansion vessels 8 being connected to a fluidized bed mill in a diametrically oppositely arranged manner. The oppositely directed jets containing the particles and the generated vapor are conducted to a grinding point 20 located in the interior of the mill 19 in the manner of a counter jet mill. The ground material is drawn off via a screening means whose screening wheel is denoted by 21, along the axle of the wheel 21, which is denoted by 22, vapor being condensed after this. By vapor condensing outside the mill 19, the pressure level can be rapidly lowered such that the disintegration performance is even further enhanced by that pressure reduction.

In the entry region of into the expansion vessel, annular ducts 10 are again arranged with their water nozzles being oriented transverse to the slag jet, the high-pressure water from the annular ducts 10 splitting and disintegrating the slag jacket.

Figure 5:
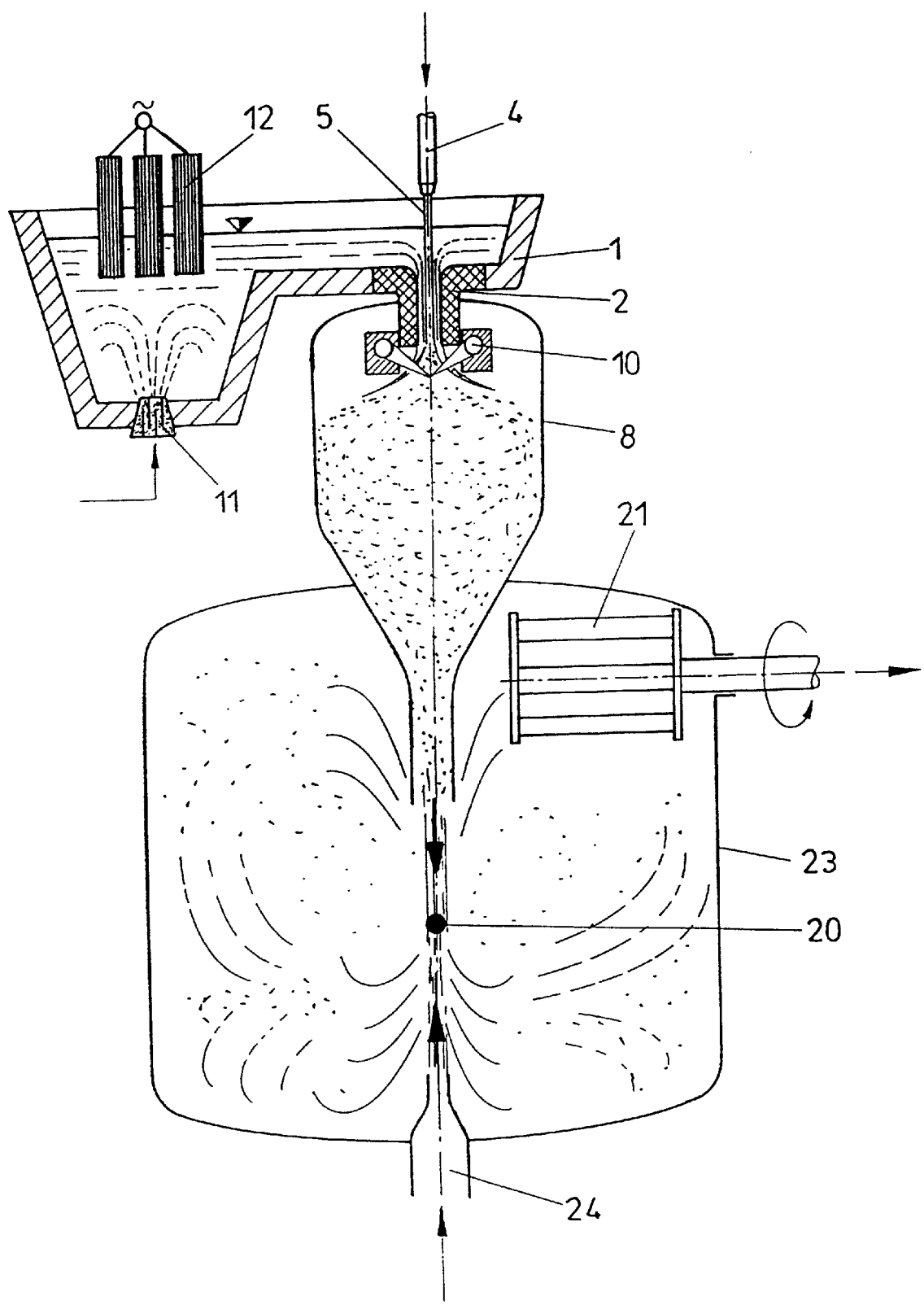
FIG. 5 depicts a partially sectioned configuration including a jet mill connected in the vertical direction coaxial with the expansion vessel.

In the embodiment according to FIG. 5, a counter jet mill 23 is provided in the vertical direction coaxially with the expansion vessel 8, wherein a counter jet of externally produced vapor is supplied through a lance 24 to the vapor particle mixture streaming into the counter jet mill 23 from top to bottom. The outlet opening of the expansion vessel 8 is designed as a two-phase nozzle, whereas the lance 24 merely is designed as a one-phase nozzle. The grinding point is again denoted by 20. The material to be ground again is discharged via the screening wheel 21 with a pressure of far below one atmosphere, for instance 0.3 to 0.75 bar, being attainable in the interior of the mill 23 due to subsequent vapor condensation outside the mill 23. The gases streaming in at a high speed because of the considerably higher pressure thereby cause intensive grinding.

Figure 6:
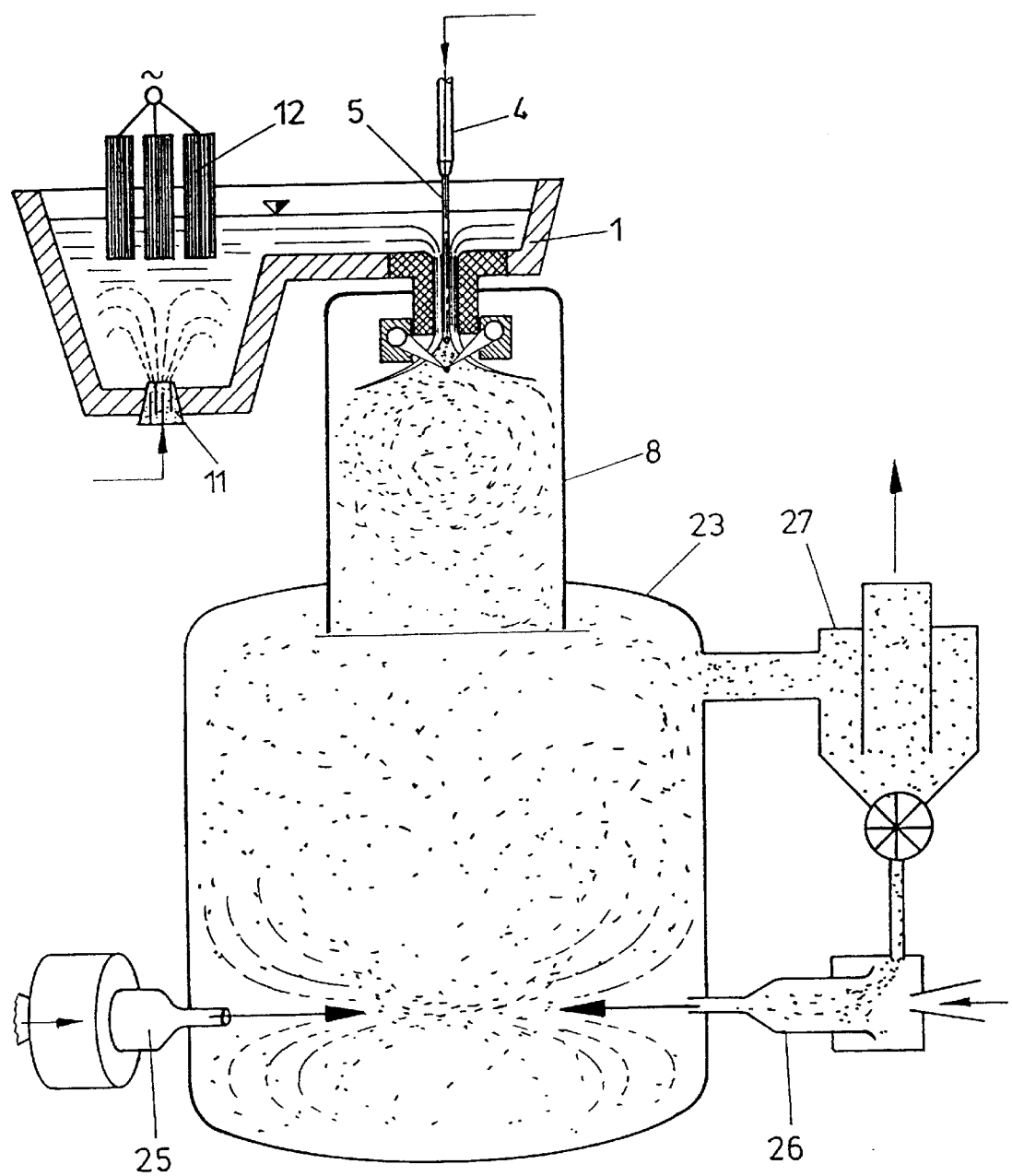
FIG. 6 illustrates a modified configuration in which grinding flows are additionally introduced into the jet mills.

In the configuration according to FIG. 6, the expansion vessel 8 again opens into a counter jet mill 23, wherein a subatmospheric pressure of about 0.3 to 0.75 bar is again adjusted by the vapor condensation effected outside the mill. Jet nozzles 25 and 26 open into the counter jet mill 23 in a diametrically opposite manner, coarse stock derived from coarse stock separation in a separator 27 being supplied to the jet nozzle 26 and recycled into the mill. A conventional screening means is again provided to follow the coarse stock separator 27, wherein the vapor condensation effected outside the mill 23 is not illustrated either for reasons of clarity. The gas within the mill 23 consists of water vapor by approximately 75% and sucked-in air by approximately 25%. The desired subatmospheric pressure within the mill 23 may be additionally lowered by an air suction ventilator not illustrated.

Figure 7:
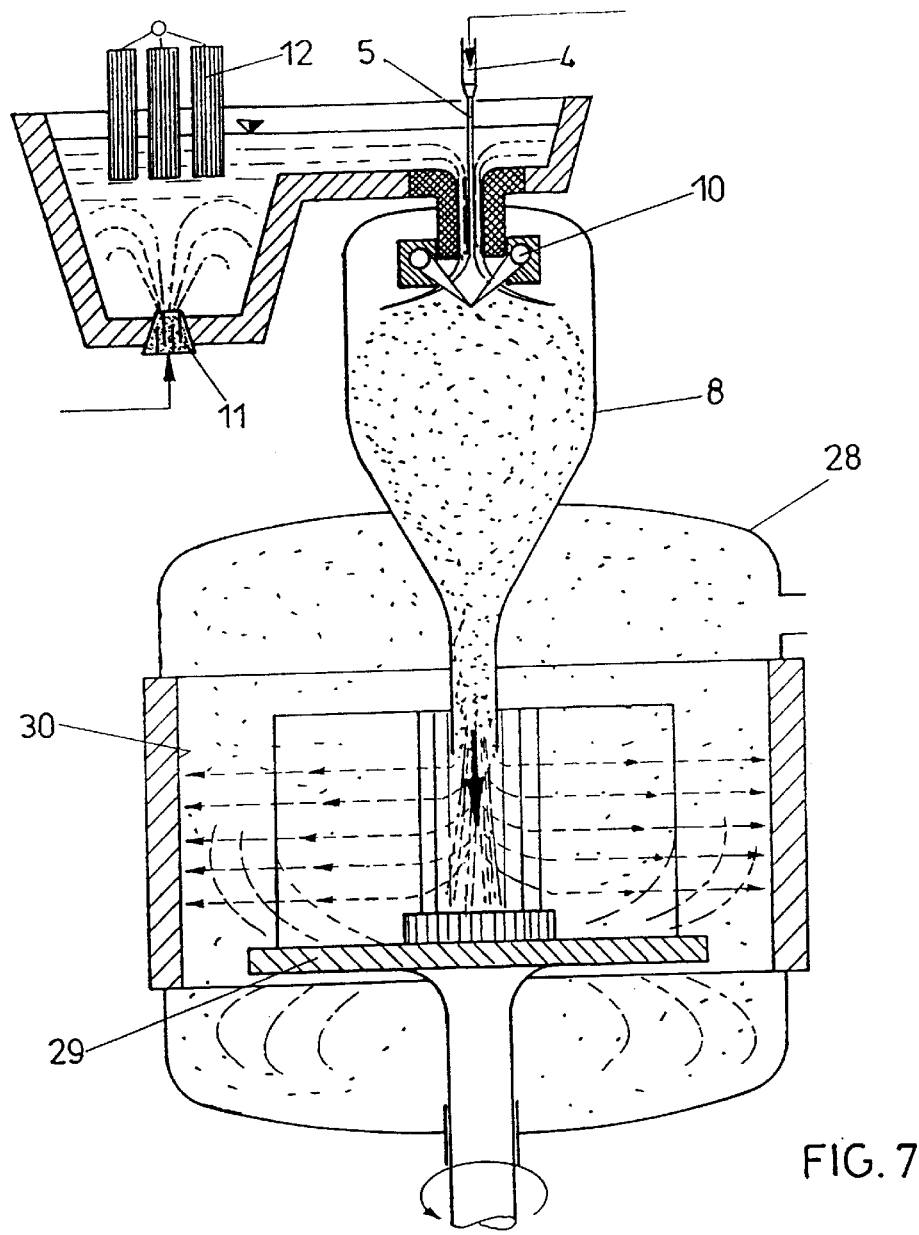
FIG. 7 shows another modified embodiment of the device according to FIG. 5 including impact surfaces designed as a centrifugal wheel.
Figure 8:
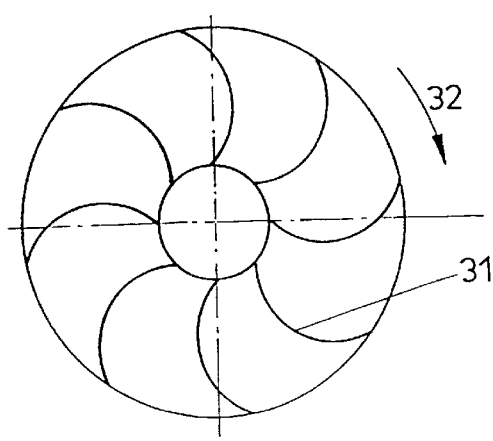
FIG. 8 is a top view on the centrifugal wheel according to FIG. 7.

In the configuration according to FIG. 7, the gas particle mixture passes from the expansion vessel 8 into an impact mill 28. The impact mill may contain a stationary baffle plate or, as in accordance with the configuration according to FIG. 7, a centrifugal wheel comprising a baffle plate 29. The particle stream sets the centrifugal wheel 29 in motion, whereby the particles are thrown against an annular armouring 30 of the mill 28 and are comminuted further. The centrifugal wheel is illustrated in the top view in FIG. 8 and comprises vanes 31 imparting a rotary direction 32 on the centrifugal wheel. Thus, a generator for generating energy may, for instance, be connected to the rotor, relatively high numbers of revolution of 5,000 to 20,000/min being readily feasible with the centrifugal wheel. As an alternative to using the centrifugal wheel as a radial turbine, the centrifugal wheel, for extreme grinding finenesses, may be connected with an actuator, thereby increasing the impact pulse on the annular armouring of the mill casing. The ground material again is drawn off the mill 28, for instance, via a screening means, the pressure within the mill 28 being lowerable to about 0.3 bar by subsequent vapor condesation.

What is claimed is:

1. A process for granulating and disintegrating slag with water, said process comprising:

directing a compressed water jet into slag in a vessel and dissolving at least one gas selected from the group consisting of oxygen, air, and oxygen/inert gas mixtures into the slag to quantitatively oxidize iron portions of the slag, the slag in the vessel being in a molten state and the at least one gas being dissolved thereinto; and discharging the slag and the compressed water jet out of the vessel through a slag outlet, the compressed water jet being discharged at a sufficiently high pressure to generate at the slag outlet a jacket of the discharged slag around the discharged compressed water jet.

2. A process according to claim 1, wherein the slag comprises blast furnace slag.

3. A process according to claim 1, wherein said directing of the compressed water jet into the slag comprises introducing the compressed water jet into the vessel at a pressure of from 35 bars to 160 bars.

4. A process according to claim 1, further comprising solidifying or partially solidifying the jacket of discharged slag.

5. A process according to claim 3, further comprising solidifying or partially solidifying the jacket of discharged slag.

6. A process according to claim 4, further comprising directing another compressed water jet into the jacket of discharged slag and cutting or splitting the jacket.

7. A process according to claim 5, further comprising directing another compressed water jet into the jacket of discharged slag and cutting or splitting the jacket.

8. A process according to claim 1, further comprising directing another compressed water jet or vapor into the vessel in a radial direction and/or tangential direction.

9. A process according to claim 3, further comprising directing another compressed water jet or vapor into the vessel in a radial direction and/or tangential direction.

10. A device for granulating slag with water, comprising:

a slag tundish for accommodating slag in a molten state, said slag tundish comprising an outlet opening for discharging the slag;

a lance aligned with the outlet open for directing compressed water jet or vapor jet into the slag tundish and causing the slag to discharge from the slag tundish as a jacket around the compressed water jet or vapor jet; and nozzles for introducing at least one member selected from the group consisting of air, oxygen, and oxygen/inert gas mixtures into the slag tundish, said nozzles being provided at the lowermost site of said slag tundish.

11. A device according to claim 10, wherein said slag tundish comprises a tubular outlet part including said outlet opening.

12. A device according to claim 11, further comprising annular nozzles provided on said tubular outlet part for passing water and/or vapor towards said outlet opening at either a radial direction or an inclined direction relative to the axis of said tubular outlet part.

13. A device according to claim 11, further comprising an expansion vessel connected to said tubular outlet part.

14. A device according to claim 13, further comprising secondary nozzles for introducing water or vapor into said expansion vessel in a radial direction and/or tangential direction.

15. A device according to claim 13, wherein said expansion vessel has an outlet opening connected to a mill.

16. An arrangement for granulating slag with water, comprising:

a slag tundish for accommodating slag in a molten state, said slag tundish comprising a tubular outlet part with an outlet opening for discharging the slag;

a lance aligned with the outlet open for directing compressed water jet or vapor jet into the slag tundish and causing the slag to discharge from the slag tundish as a jacket around the compressed water jet or vapor jet;

nozzles for introducing at least one member selected from the group consisting of air, oxygen, and oxygen/inert gas mixtures into the slag tundish, said nozzles being provided at the lowermost site of said slag tundish;

an expansion vessel connected to said tubular outlet part; and a mill comprising a rotor designed as a centrifugal wheel, a baffle plate, or a counterflow nozzle for receiving vapor and/or grinding material coaxially relative to said outlet opening of said expansion vessel.

* * * * *

UNITED STATES PATENT AND TRADEMARK OFFICE
CERTIFICATE OF CORRECTION

PATENT NO.    : 6,319,434 B1
DATED         : November 20, 2001
INVENTOR(S)   : Alfred Edlinger It is certified that error appears in the above-identified patent and that said Letters Patent is hereby corrected as shown below:

Title page,
Item [30], Foreign Application Priority Data
-- [30]  Foreign Application Priority Data
    Feb. 18, 1998    (AT).................................94/98 U --

Signed and Sealed this

Twenty-fourth Day of September, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,319,434 B1                                                Page 1 of 1
DATED         : November 20, 2001
INVENTOR(S)   : Alfred Edlinger It is certified that error appears in the above-identified patent and that said Letters Patent is hereby corrected as shown below:

<u>Title page,</u>
Item [30], Foreign Application Priority Data should appear as follows:
-- [30]   Foreign Application Priority Data
       Feb. 18, 1998        (AT)……………………………..94/98 U --

Signed and Sealed this

Fifteenth Day of October, 2002

Attest:

Attesting Officer

JAMES E. ROGAN
*Director of the United States Patent and Trademark Office*